Patented July 14, 1942

2,289,540

UNITED STATES PATENT OFFICE 2,289,540

POLYMERIZATION OF WATER SOLUBLE POLYMERS

Harry R. Dittmar and Daniel E. Strain, Wilmington, Del., assignors to E. I. du Pont de Nemours & Company, Wilmington, Del., a corporation of Delaware No Drawing. Application April 18, 1939, Serial No. 268,526

13 Claims. (Cl. 260—83)

This invention relates to a polymerization process and, more particularly, to the polymerization of water-soluble polymerizable organic compounds.

It is known that the products obtained by the polymerization of polymerizable organic compounds are, due to their high molecular weight, soluble only to a limited extent in water or oxygenated organic compounds and tend to produce highly viscous solutions. There is a small group of polymerizable organic compounds which are water-soluble but which, upon polymerization, become considerably less soluble in water. Important new uses for these polymers could be developed if their solutions in water or oxygenated organic compounds were less viscous.

An object of the present invention is to provide a process for the polymerization of water-soluble, organic polymerizable compounds. Another object of the invention is to provide a process for the polymerization, in an aqueous medium, of the water-soluble, polymerizable compounds which, prior to polymerization, have the group,

Yet another object of the invention is to provide water-soluble polymerization catalysts which will accelerate polymerization of water-soluble organic polymerizable compounds to products which will give extremely low viscosity water solutions. A further object of the invention is to provide polymeric organic compound water solutions of low viscosity. Other objects and advantages of the invention will hereinafter appear.

According to the invention, the above and other important objects are accomplished by dissolving the polymerizable water-soluble organic compound in water with a water-soluble peracid, or salt thereof, and particularly water-soluble persulfates, and thereafter subjecting said solution to polymerizing conditions. By polymerizing in an aqueous solution, in accord with this invention and the catalyst provided thereby, it is possible to obtain polymeric products which form low viscosity solutions in water. For example, methacrylic acid, polymerized in a 10% water solution at 95° C., with 1.5% benzoyl peroxide as the catalyst, gives a polymer having a viscosity of 0.14 poises at 25° C. when 8% thereof has been dissolved in the water. If the concentration of polymethacrylic acid in water is increased to about 11%, the solution becomes gel-like and too viscous to handle readily. Increasing the amount of benzoyl peroxide or increasing the polymerization temperature does not produce the expected reduction in polymer viscosity. On the other hand, if ammonium persulfate be employed, a much greater solubility is effected as is evidenced by the product of reaction 3. (see below) which can be dissolved in water to give an 8% solution having a viscosity of 0.048 poise at 25° C.

The following table gives a viscosity data for methacrylic acid polymers which were obtained by polymerizing 10% monomer solutions in water using fixed amounts of ammonium persulfate as the catalyst and definite reaction temperatures (except for the brief period during which the temperature was elevated by the exothermic nature of the polymerization). The general procedure for the polymerizations was as described in Example 1, below.

| Reaction number | Percent $(NH_4)_2S_2O_8$ (based on monomer) | Polymerization temperature, °C. | Viscosity (poises) of an 8% aqueous solution of polyacid |
|---|---|---|---|
| 1 | 1.0 | 85 | 0.08 |
| 2 | 1.0 | 90 | 0.06 |
| 3 | 1.0 | 95 | 0.048 |
| 4 | 2.0 | 90 | 0.04 |
| 5 | 0.25 | 90 | 0.125 |

By proper selection of catalyst concentration, temperature and monomer concentration, this catalyst can be employed readily in the preparation of any desired polymer over a wide viscosity range.

Data for similar experiments employing benzoyl peroxide are given for comparison. In these experiments the benzoyl peroxide was dissolved in the monomeric acid and this solution was added to stirred water which had been preheated to the polymerization temperature (90 parts water to 10 parts monomer).

| Reaction number | Percent benzoyl peroxide (based on monomer) | Polymerization temperature, °C. | Viscosity (poises) of an 8% aqueous solution of polyacid |
|---|---|---|---|
| 6 | 1.5 | 85 | 0.10 |
| 7 | 1.5 | 95 | 0.14 |
| 8 | 1.0 | 90 | 0.105 |
| 9 | 0.5 | 90 | 0.10 |
| 10 | 0.25 | 90 | 0.09 |

When hydrogen peroxide is used as the catalyst, yields of polyacid are poorer than with the catalysts described above and polymerization times are much longer. The polymers are also considerably higher in viscosity than products which can be obtained readily with persulfate catalysts in better yields and in shorter times. Some data on polymerizations with hydrogen peroxide as the catalyst are given below. In these experiments the hydrogen peroxide-water solution was heated to polymerization temperature, the monomer was then added and the polymerization was carried out with stirring. The water-monomer ratio was 90–10.

| Reaction number | Percent $H_2O_2$ (based on monomer) | Polymerization temperature, °C. | Viscosity (poises) of an 8% aqueous solution of polyacid |
| --- | --- | --- | --- |
| 11 | 1.0 | 90 | 0.08 |
| 12 | 2.5 | 90 | 0.062 |
| 13 | 5.0 | 90 | 0.115 |
| 14 | 5.0 | 85 | 0.075 |
| 15 | 5.0 | 95 | 0.13 |

It will be noted that lower viscosity polymers are not obtained by using increased amounts of hydrogen or benzoyl peroxides or by using increased temperatures with these catalysts. When lower temperatures or lower catalyst concentrations are used, the polymerization times become exceedingly long.

The following polymerizations were carried out as in Example 1 using 10% monomer in water at 90° C. and 1% and 2% sodium persulfate as the polymerization catalyst:

| Reaction number | Percent $Na_2S_2O_8$ (based on monomer) | Viscosity (poises) of an 8% aqueous solution of polyacid |
| --- | --- | --- |
| 16 | 1 | 0.06 |
| 17 | 2 | 0.04 |

This catalyst is comparable with ammonium persulfate for use in the production of low viscosity polymers.

Polymeric acid of still lower viscosity is obtained if the monomeric acid is added slowly to the heated catalyst solution.

The more detailed practice of the invention is illustrated by the following examples, in which parts are given by weight unless otherwise stated. There are, of course, many forms of the invention other than the specific embodiments.

*Example 1.*—The reaction mixture consisted of:

| | Parts |
| --- | --- |
| Methacrylic acid | 10 |
| Water | 90 |
| Ammonium persulfate | 0.2 |

The water was heated to a temperature of 90° C. in a vessel equipped with a reflux condenser and stirrer. The ammonium persulfate was then added and, after it had dissolved, the monomeric acid was added and the temperature held as nearly as possible at 90° C. After heating for 5 minutes, exothermic polymerization set in and the temperature rose to 96° C. without the application of more heat. Polymer separated from solution during this period. Substantial completion of polymerization was indicated by the temperature falling and disappearance of monomeric odor about 15 minutes after the monomer was added. Heating was continued 30 minutes, then the reaction mixture was allowed to cool. Stirring was employed throughout the polymerization and cooling. During the cooling step the separated polymer dissolved. The resulting solution, when diluted to 8% polymeric methacrylic acid, had a viscosity of 0.04 poise at 25° C. Water solutions containing as much as 18% of this polymer are not gel-like and can be readily handled. The yield of polymer was quantitative. A 10% solution of the partial salt obtained by neutralizing the poly acid with 27% the theoretical amount of NaOH had a viscosity of 0.05 poise.

*Example 2.*—In a vessel equipped with a mechanical stirrer, reflux condenser, and dropping funnel, 840 parts of water was heated to 100° C. Three and two tenths parts of ammonium persulfate was then added and 2 minutes later (the persulfate had dissolved by this time) the addition of 160 parts of methacrylic acid monomer was started at such a rate that addition was complete in 53 minutes. The temperature in the reaction mixture was maintained at 99–100° C. over this period and for 10 minutes after the addition of monomer was completed. Stirring was employed throughout.

A theoretical polymer yield was obtained. A 16% aqueous solution of this polymer had a viscosity of 18 poises at 25° C. and an 8% solution of the polymer has a viscosity of 0.025 poise at this temperature.

Still lower viscosity polymers are obtained if the monomeric acid is partially neutralized prior to polymerization and lower yet if the partially neutralized monomer is added continuously to the polymerization vessel as will be illustrated by the following examples.

*Example 3.*—In a vessel equipped with a mechanical stirrer, reflux condenser, and dropping funnel, 818.5 parts of water was heated to 90° C. Three and two-tenths parts of ammonium persulfate was added, followed in 2 minutes by a solution made up from 160 parts methacrylic acid monomer, 20 parts sodium hydroxide (27% the quantity required for neutralization) and 70.5 parts water. The reaction mixture was held at 90° C. with stirring except for the brief period during which the exothermic nature of the reaction caused an elevation in temperature. The polymerization was essentially complete within 10 minutes of the addition of monomer. Heating was continued for a period of 25 minutes after the monomer was added. A theoretical yield of polymer was obtained. A 10% aqueous solution of this 27% neutralized polymethacrylic acid had a viscosity of 0.032 poise at 25° C. (The 16% solution had a viscosity of 2.7 poises.)

When a polymerization was carried out as above using 2% ammonium persulfate as the catalyst at 90° C. with 16% of methacrylic acid monomer (free acid), followed by 27% neutralization with sodium hydroxide after polymerization was completed, a 10% aqueous solution of this 27% neutralized polyacid salt had a viscosity of 0.145 poise (compare with Example 1 for effect of monomer concentration during polymerization on polymer viscosity).

*Example 4.*—In a vessel equipped with a mechanical stirrer, reflux condenser, and dropping funnel, 673 parts of water was heated to 100° C. Eight parts of ammonium persulfate was then added and after 3 minutes the introduction of a solution made up of 200 parts methacrylic acid monomer, 25 parts sodium hydroxide and 171 parts water was started at such a rate that addition was complete in 30 minutes. Heating was continued for about 30 minutes after the monomer addition was complete. The temperature was maintained at 99–100° C. and stirring was employed throughout. If desired the catalyst can be added as an ingredient of the monomer solution.

A theoretical yield of polymer was obtained. The 20% polyacid solution (27% neutralized) had a viscosity of 0.4 poise and when diluted to 10% had a viscosity of 0.01 poise at 25° C.

*Example 5.*—In a flask equipped with a stirrer and reflux condenser, 840 parts of water was heated to 90° C. At this temperature, 3.2 parts of ammonium persulfate was added, followed immediately by a mixture of 153.6 parts of monomeric methacrylic acid and 6.4 parts of methyl methacrylate monomer. The temperature was readjusted to 90° C. and held at this point (except for the brief reaction period when the temperature was higher) for approximately 30 minutes. Stirring was employed throughout the polymerization. Within 6 minutes of the time monomer was added, polymeric material was separating from the solution. At the end of the 30 minute heating period a solution of 19.2 parts of sodium hydroxide was added as a 34.5% solution. Complete solution was obtained in a few minutes. A theoretical yield of polymer was obtained. The 27% neutralized interpolymer salt solution at 10% solids had a viscosity of 0.10 poise.

*Example 6.*—Ten parts of methacrylamide monomer and 0.2 part of ammonium persulfate were dissolved, in the order named, in 90 parts of water at about 85° C. and the solution was heated for about 1 hour at approximately 85–90° C. A clear, low viscosity solution was obtained. The polymer was precipitated from a 50 g. sample of this solution by addition of acetone. (This treatment does not precipitate methacrylamide monomer.) The polymer was washed with acetone, air dried, and dried at 100° C. Five grams of dried resin was obtained, indicating a theoretical yield of polymer.

*Example 7.*—A solution of 900 parts water, 75 parts methacrylamide monomer, 25 parts of methacrylic acid monomer and 1 part ammonium persulfate was heated from about 75 to 95° C. over a period of 35 minutes with mechanical stirring. A water insoluble interpolymer was obtained which was filtered off and dried. This product is readily soluble in dilute ammonium hydroxide.

The above examples are merely illustrative, since the invention broadly embraces the polymerization of water-soluble polymerizable organic compounds in an aqueous vehicle and in the presence of true per-acids or salts thereof as the catalyst.

In general, the process is applicable to the whole group of water-soluble polymerizable organic compounds, among which are included acrylic acid, acrylamide, methacrylic acid, methacrylamide, methyl vinyl ketone, ethyl vinyl ketone, methyl alpha-methyl vinyl ketone, glycol monoacrylate, glycol monomethacrylate, glycerol monoacrylate, glycerol monomethacrylate, and like water-soluble polymerizable organic compounds.

The invention is likewise applicable to the preparation of water-soluble interpolymers by the polymerization of a water-soluble mixture of two or more monomeric substances such, for example, as acrylic acid and methacrylic acid. Many monomers which are not generally considered water soluble are miscible to a considerable extent with a solution of a water-soluble monomer in water and hence may be employed. Methacrylic and vinyl esters are examples of such monomers. Water miscible solvents such as alcohols and ketones may be used in these aqueous systems to increase the solubility of sparingly soluble monomers.

The polymerization catalysts which are suitable for effecting polymerization in accord with this invention include: the water soluble salts of persulfuric acid, percarbonic acid, perphosphoric acid and sulfo-per-acid (Caro's acid), as well as the corresponding free acids and, more particularly, the sodium potassium, and ammonium persulfates.

The quantity of persulfates or the other above-designated polymerization catalysts employed may vary under ordinary conditions from 0.1 to 5% by weight of the polymerizable organic compound but approximately 2% has been found most desirable in the majority of cases. The proportions of catalyst used will depend to a great extent upon the rate of polymerization and the viscosity of the polymeric solution desired.

The concentration of the polymerizable compound in the aqueous vehicle does, to a certain extent, affect the course or extent of the polymerization. The lower the monomer concentration with a given catalyst ratio, the lower will be the viscosity of the polymer produced. There is a limit to the monomer concentration which can be used with high catalyst contents because of the violence of the reaction. Continuous addition of monomer gets around this difficulty. It has been found that thorough polymerization with a highly soluble polymer results if from 5 to 35% of the acrylic or methacrylic acid or other water-soluble monomer is polymerized in an aqueous medium. To obtain the greatest possible solubility, high concentrations of catalysts are generally preferred, ranging, say, from 2 to 5%. The polymerization, for the preparation of highly soluble polymer or for moderately soluble polymer, should generally be carried out at a temperature ranging between 70 and 100° C.

Although one of the primary features of this invention involves the polymerization in an aqueous medium to obtain a product which is highly soluble in water, the process is, nevertheless, applicable to the polymerization of polymerizable organic compounds, the monomers of which are water soluble to polymers which are insoluble in water. When such polymerizations are carried out in an aqueous medium, the polymer precipitates as formed. Under such circumstances, of course, the major feature of the invention is not realized, namely, the production of a polymer highly soluble in water, but a product is obtained which is of low molecular weight and it will be found to give a lower viscosity solution in the solvents in which it is soluble than will a polymer of the same nature which has been polymerized by the use of other polymerization catalysts.

Polymerizable organic compounds, the monomers and polymers of which are water soluble, may be polymerized if desired in an aqueous medium containing a non-solvent for the polymer which causes the polymer to be precipitate from the medium as formed. Such a process facilitates the preparation of a solid product.

Polymerizable water-soluble organic compounds may be polymerized by the use of a number of different types of polymerization catalysts such, for example, as benzoyl peroxide, sodium perborate, ultra-violet light and the like. The products obtained by these orthodox polymerization processes, however, give a product which, as has been indicated, is not highly soluble in water. This product can, however, be treated in accord with the process of this invention to give a more highly soluble polymer. This may be effected by adding to an aqueous solution of the polymer one of applicants' preferred polymerization catalysts such as ammonium persulfate and heating the resulting solution. Generally speaking, from 5 to 35 parts of the relatively high molecular weight polymer in, say, 90 parts of water can be heated to from 80 to 170° C. with from 0.5 to 3% of ammonium persulfate to give a solution of very low viscosity. If desired, substantially the same effect will result without the heating step if the solution containing the polymer and the catalyst is drum-dried. By this means, it is possible to increase the solubility of polymers to substantially the same degree of solubility as it is possible to obtain by carrying out the complete polymerization in accord with the present invention. When acidic polymers, such as the polymers of acrylic and methacrylic acids, are treated to increase their water solubility, it may be advisable to partially or completely neutralize the acid by the addition of sodium hydroxide or other suitable alkaline medium prior to the heat treatment with the persulfate. A suitable operating range is between pH 4 and pH 7.

In the following table data are given which illustrate the reduction in viscosity effected by drum drying a partially neutralized polymethacrylic acid with varying amounts of ammonium persulfate and with hydrogen peroxide. A 10% polymethacrylic acid solution was adjusted to a pH of 5.2 by the addition of sodium hydroxide. Varying amounts of viscosity reducing agents were added to portions of this solution. The solutions were dried on a drum drier operating at 50-60 lbs. per sq. in. steam pressure and 7 R. P. M.

| Agent and concentration (based on polymethacrylic acid) | Viscosity (poises) of 10% drum dried salt solution at 25° C. |
| --- | --- |
| None | 0.53 |
| 0.5% (NH$_4$)$_2$S$_2$O$_8$ | 0.3 |
| 1.0% (NH$_4$)$_2$S$_2$O$_8$ | 0.24 |
| 1.5% (NH$_4$)$_2$S$_2$O$_8$ | 0.18 |
| 2.0% (NH$_4$)$_2$S$_2$O$_8$ | 0.15 |
| 2.0% H$_2$O$_2$ | 0.21 |

Aqueous solutions of polymeric acrylic acid and methacrylic acid obtained in accord with the present invention are particularly well adapted for use as leather tanning assistants.

From a consideration of the above specification, it will be realized that many changes may be made in the details therein given without departing from the scope of the invention or sacrificing any of the advantages that may be derived therefrom.

We claim:

1. A process of polymerizing an organic acid, having the group CH$_2$:C:, polymerizable to a water soluble polymer which comprises dissolving the polymerizable organic acid in water and effecting its polymerization in the presence of from 0.1 to 5% by weight, of said organic compound, of a compound of the group consisting of water soluble salts of persulfuric, percarbonic, perphosphoric and sulfo-per-acids and the free acids.

2. A process of polymerizing methacrylic acid to a water-soluble polymer which comprises effecting the polymerization of the methacrylic acid in water containing as the catalyst a compound selected from the group consisting of water soluble salts of persulfuric, percarbonic perphosphoric and sulfo-per-acids and the free acids.

3. A process of polymerizing acrylic acid to a water-soluble polymer which comprises effecting the polymerization of the acrylic acid in water containing as the catalyst a compound selected from the group consisting of water soluble salts of persulfuric, percarbonic, perphosphoric and sulfo-per-acids and the free acids.

4. A process of polymerizing acrylic acid to a water-soluble polymer which comprises subjecting to polymerizing conditions an aqueous solution containing from 5 to 35% acrylic acid and from 0.1 to 5% of a compound selected from the group consisting of water soluble salts of persulfuric, percarbonic, perphosphoric and sulfo-per-acids and the free acids.

5. A process for the preparation of low molecular weight polymeric methacrylic acid to a water-soluble polymer which comprises heating to a temperature of from 60 to 100° C., an aqueous solution containing from 5 to 35% methacrylic acid and from 0.1 to 5% of ammonium persulfate.

6. A process for the preparation of low molecular weight polymeric methacrylic acid to a water-soluble polymer which comprises bringing 5 to 35 parts of a relatively high molecular weight polymeric methacrylic acid in 90 parts of water into contact with 0.5 to 3 parts of ammonium persulfate at a temperature between 80 and 170° C.

7. Water soluble polymeric methacrylic acid which, when dissolved in water containing 8% by weight of the polymer, will give a solution having a viscosity of not more than 0.05 poise at 25° C.

8. A process of polymerizing an acid to a water-soluble polymer having the formula:

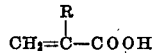

in which R is a radical of the group consisting of hydrogen and alkyl groups which comprises effecting the polymerization of the acid while dissolved in a solvent medium containing as the polymerization catalyst a compound of the group consisting of water soluble salts of persulfuric, percarbonic, per phosphoric acid sulfo-per-acids and the free acids.

9. The process of claim 8 wherein the acid is neutralized to a pH of from 4 to 7 prior to polymerization.

10. A process of polymerizing a mixture of organic acids having the group CH$_2$:C:, which acids are polymerizable to a water soluble interpolymer which comprises effecting the polymerization of the mixture of acids while dissolved in an aqueous medium containing as the polymerization catalyst a compound of the group consisting of water soluble salts of persulfuric, percarbonic, perphosphoric and sulfo-per-acids and the free acids.

11. A process of polymerizing an organic acid having the group CH$_2$:C: and polymerizable to a water-soluble polymer which comprises heating to a temperature of from 60 to 100° C. an aqueous solution consisting of the polymerizable organic acid and a catalyst selected from the group consisting of water-soluble salts of persulfuric, percarbonic, perphosphoric, sulfo-per-acids and the free acids.

12. A process of polymerizing methacrylic acid to a water-soluble polymer which comprises heating to a temperature of from 60 to 100° C. an aqueous solution consisting of methacrylic acid and a catalyst selected from the group consisting of water-soluble salts of persulfuric, percarbonic, perphosphoric, sulfo-per-acids and the free acids.

13. A process of polymerizing acrylic acid to a water-soluble polymer which comprises heating to a temperature of from 60 to 100° C. an aqueous solution consisting of acrylic acid and a catalyst selected from the group consisting of water-soluble salts of persulfuric, percarbonic, perphosphoric, sulfo-per-acids and the free acids.

HARRY R. DITTMAR.
DANIEL E. STRAIN.